United States Patent
Enghauser et al.

(10) Patent No.: US 7,120,616 B2
(45) Date of Patent: Oct. 10, 2006

(54) METHOD FOR SPECIFYING, EXECUTING AND ANALYZING METHOD SEQUENCES FOR RECOGNITION

(75) Inventors: Peter Enghauser, Constance (DE); Gert Seidel, Constance (DE)

(73) Assignee: Siemens AG, München (DE)

( * ) Notice: Subject to any disclaimer, the term of this patent is extended or adjusted under 35 U.S.C. 154(b) by 871 days.

(21) Appl. No.: 10/086,865

(22) Filed: Mar. 4, 2002

(65) Prior Publication Data
US 2002/0165876 A1 Nov. 7, 2002

(30) Foreign Application Priority Data
Mar. 2, 2001 (DE) ................. 101 10 208

(51) Int. Cl.
G06N 3/08 (2006.01)
G06F 15/18 (2006.01)
G06E 1/00 (2006.01)
G06E 3/00 (2006.01)

(52) U.S. Cl. .................. 706/25; 382/182; 382/140; 706/20; 369/18

(58) Field of Classification Search ............. None
See application file for complete search history.

(56) References Cited

U.S. PATENT DOCUMENTS

| | | | | |
|---|---|---|---|---|
| 3,805,237 A * | 4/1974 | Cobb et al. | ............. | 382/176 |
| 4,315,315 A * | 2/1982 | Kossiakoff | ............. | 717/109 |
| 4,589,144 A * | 5/1986 | Namba | ............. | 382/175 |
| 4,831,580 A * | 5/1989 | Yamada | ............. | 717/105 |
| 4,901,221 A * | 2/1990 | Kodosky et al. | ............. | 715/771 |
| 4,914,568 A * | 4/1990 | Kodosky et al. | ............. | 715/763 |
| 4,992,649 A * | 2/1991 | Mampe et al. | ............. | 209/546 |
| 5,031,223 A * | 7/1991 | Rosenbaum et al. | ............. | 382/101 |
| 5,148,522 A * | 9/1992 | Okazaki | ............. | 715/855 |
| 5,301,301 A * | 4/1994 | Kodosky et al. | ............. | 716/11 |
| 5,301,336 A * | 4/1994 | Kodosky et al. | ............. | 715/846 |
| 5,311,999 A * | 5/1994 | Malow et al. | ............. | 209/583 |
| 5,353,233 A * | 10/1994 | Oian et al. | ............. | 702/76 |
| 5,386,508 A * | 1/1995 | Itonori et al. | ............. | 717/109 |
| 5,475,851 A * | 12/1995 | Kodosky et al. | ............. | 715/763 |
| 5,481,740 A * | 1/1996 | Kodosky | ............. | 715/839 |
| 5,481,741 A * | 1/1996 | McKaskle et al. | ............. | 345/522 |
| 5,754,671 A * | 5/1998 | Higgins et al. | ............. | 382/101 |
| 6,665,422 B1 * | 12/2003 | Seidel et al. | ............. | 382/101 |

* cited by examiner

*Primary Examiner*—Anthony Knight
*Assistant Examiner*—Ronald E. Williams, Jr.
(74) *Attorney, Agent, or Firm*—Siemens AG

(57) ABSTRACT

A method for specifying, executing and analyzing method sequences for the recognition of dispatch labels and form entries. In the specification phase, the method sequences are input in graphical form into a computer system as flowcharts with attributes and function details which define the influence of individual variables on the method sequence. Codes are then automatically generated from the flowcharts as an internal representation which is converted by a compiler into a loadable, executable module which is called for each processing step in the handling phase for recognizing the respective dispatch label or form entry. In the handling phase for recognition, information for describing the particular current sequence and the current values of the attributes is written to an attribute file for each processing step. In the analysis phase, the course of processing for each dispatch or each form is displayed in the flowcharts with the attributes together with the associated images of the dispatch labels or form entries.

10 Claims, 3 Drawing Sheets

```
#INCLUDE "INTERFACE.CPP"

VOID PROCEVENT();          //CODING
VOID CHECKCODING();        //CODING
VOID UAA_DUETOMOVE();      //UAA_MOVE
VOID DECIDENIXIE();        //NIXIE
VOID POSTPROC();           //POST_PROC
```

12

13 RETURN TO RIC

14 TRACEVAR (RESULTSTATUS);
TRACEVAR (UPDATEDSU);

15 POSTPROC() — DO SOME STATISTIC

16 LET RIC PERFORM NEXT CODING STEP/DECISION

METHOD FOR SPECIFYING, EXECUTING AND ANALYZING METHOD SEQUENCES FOR RECOGNITION

BACKGROUND OF THE INVENTION

The invention relates to a method for specifying, executing and analyzing method sequences for the recognition of dispatch labels and form entries.

The recognition is performed using OCR reading systems and video coding systems, where, if the reading results of the OCR reading system are not clear, the corresponding images of the dispatch labels or forms are sent to video coding stations where manual or partly manual coding with different coding steps is effected using databases for the labels. The labels to be read on the dispatches are largely addresses, and the databases used are address or forwarding dictionaries. The stipulated method sequence as the fundamental part of flow control is used to monitor and control the flow of processing for each individual dispatch or each form.

The method sequence defines for each dispatch or each form the sequence of the individual processing steps and the final decision regarding what needs to be done with the dispatch or with the form in the overall system. For all decisions, all information which is relevant to the decision and is available at this time is evaluated. Information relevant to the decisions is, by way of example, details about the type of sorting machine, the type of the individual coders and recognition results obtained to date. When all the necessary steps have been carried out, the results are sent to the sorting machine so that the dispatch or form can be distributed on the basis of this result.

DESCRIPTION OF THE RELATED ART

To date, generic method sequences have been described and implemented using a rule-based approach. Depending on the instance of application, hundreds of rules may therefore be needed in order to describe all the possible sequences. It has been possible to maintain these extensive rule mechanisms only with very great difficulty, however, and even small changes have had unforeseeable consequences or have resulted in a significant increase in the number of rules. Specifying and analyzing the rules for consistency and completeness has required a very high level of effort.

SUMMARY OF THE INVENTION

The invention is therefore based on the object of providing a method which greatly reduces the effort for specifying and analyzing generic method sequences.

The invention's graphical representation in the form of a flowchart for the method sequences with attributes and function details, the automatic conversion into a loadable module which is called on the basis of the respective processing step, and the analysis using the clear representation significantly reduce the effort required for specifying and analyzing the method sequences, in particular in test phases.

It is thus advantageous for value ranges and comments also to be entered in addition to the attributes.

It is also advantageous for not only the current values but also associated references relating to the names, comments and/or to the relevant elements/processing steps in the flowchart to be entered into the attribute file.

DESCRIPTION OF THE PREFERRED EMBODIMENTS

In another advantageous development, during analysis, the current method step is marked in the displayed flowchart.

For the sake of improved clarity, it is also advantageous for the attributes and comments of the current marked method step to be displayed.

The advantageous refinements above facilitate analysis of the method sequences.

It is also advantageous if, during the analysis, the parameters of the variables and/or functions are changed online and are entered into the flowchart.

BRIEF DESCRIPTION OF THE DRAWINGS

The invention is explained in more detail below in an exemplary embodiment with reference to the drawings, in which FIGS. 1*a* and *b* show a flowchart (part) as a graphical description of a method sequence for video coding a dispatch address.

DESCRIPTION OF THE PREFERRED EMBODIMENTS

Figure 1A:
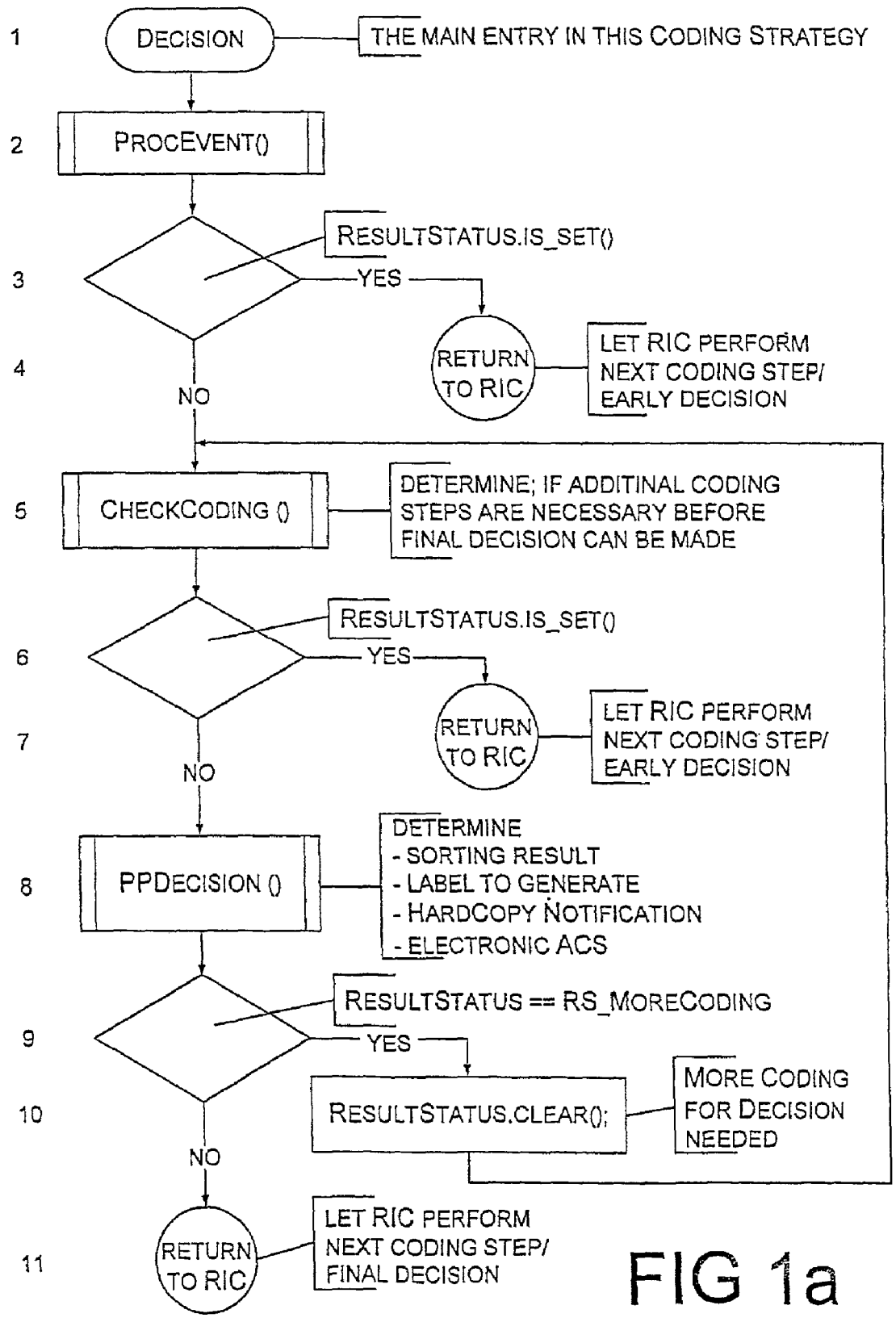
Figure 1B:
Figure 1B:
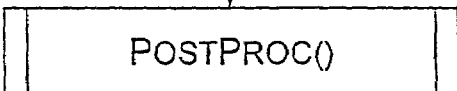
Figure 1B:
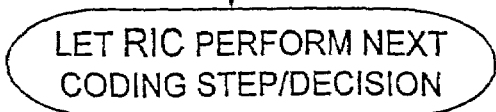

The system described in the present case uses depicted flowcharts as a basis for providing an integrated graphical development environment for specifying, executing and analyzing method sequences for the recognition (automatic reading and/or video coding) of dispatch labels and form entries. This integrated graphical development environment comprises the graphical description of the sequences, production of the runtime environment and suitable tools for testing and diagnosing the sequences.

Specifically, the Following Functions are Supported
 1. Recording and changing of the graphical description of the method sequence (in this case using Microsoft's Office drawing program VISIO),
 2. Computer-aided automatic generation of program code (in this case C++code) from the graphical description,
 3. Tools for analysis (diagnosis and debugging) on the level of the original drawing (debugging and trace tools).

During overall processing, the flowcharts drawn remain the only program source, i.e. all the parts generated represent only a means to the end and do not need to be maintained by the user. The tools for analysis (diagnosis and debugging) likewise work with direct access to the graphical description.

The text below illustrates the method sequence for video coding dispatch addresses (coding strategy) as an example of application.

The coding strategy is described by one or more drawings on the basis of standardized drawing elements imitating ISO flowcharts. In addition, attributes and functions are defined in the drawings (e.g. in the form of special tables). Attributes and functions define the details of the influence of individual variables and their current values on the sequence of the coding strategy.

Attributes are defined by a name and a type. The types supported are "text" and "number". In addition, a value range and a comment can also be indicated for each attribute. The value range describes the set of possible values for an attribute, and the comments should explain the significances of the attributes. This means that later it is possible to associate the comments with the current values automatically during analysis, which increases clarity enormously during analysis.

Attributes are either supplied to the coding strategy via the interface as input from the shell program or have a nature which is local to the coding strategy (e.g. for storing intermediate results).

In the case of functions, a distinction is likewise drawn between two types. Either functions are defined within the coding strategy (local functions) or they are part of the shell program and are called by the coding strategy with the current parameters.

FIG. 1 shows, as an example, part of the method sequence (coding strategy) for video coding dispatch addresses.

An explanation of this is given in the table below.

TABLE 1

| Reference No | Description |
|---|---|
| 1 | Start the DECISION function; this is the main function of this coding strategy |
| 2 | Call the PROC EVENT function; this function is defined in the shell program (see comment 12) |
| 3 | Check whether RESULT STATUS attribute has been set |
| 4 | Jump to RETURN TO RIC continuation marker |
| 5 | Call the CHECK CODING function; ascertains what further coding steps need to be executed |
| 6 | Check whether RESULT STATUS attribute has been set |
| 7 | Jump to RETURN TO RIC continuation marker |
| 8 | Call the PP DECISION function; ascertains all the features of the sorting result |
| 9 | Check whether RESULT STATUS attribute equals RS_MORE CODING, i.e. checks whether further coding steps are necessary |
| 10 | Resets RESULT STATUS attribute |
| 11 | Jump to RETURN TO RIC continuation marker |
| 12 | List the functions of the shell program which are called from the coding strategy |
| 13 | RETURN TO RIC continuation marker |
| 14 | Call the TRACE VAR functions for the RESULT STATUS and UPDATE DSU attributes |
| 15 | Call the POST PROC function; processes statistics |
| 16 | Return to shell program; the next decision in the coding strategy can then be called |

The coding strategy fully described by the flowchart is read in and is coverted into an internal repesentation (by VISIO using automation). From this internal representation, program cod (C++source code) is generated for the coding strategy. The C-compiler is then used to produce a loadable module which is called by the shell of the coding strategy. The coding strategy is called for any changes to the attributes of a dispatch, and the rest of the sequence is redefined.

Besides the generated code for the actual method sequence, code for producing trace objects is additionally generated which controls the recording of diagnostic information during the time the coding strategy is running. The trace objects contain all the information relating to the attributes (current values, reference to names and comments) and a unique reference to the original elements of the flowchart.

While the coding strategy is being executed, for each call, these trace objects are stored together with the values of the attributes in a trace buffer per dispatch. If the trace function has been activated for the coding strategy, the trace buffers are stored in an attribute file for later analysis after a dispatch has been processed in full by the coding system. If the trace function is not active, the trace buffers are not stored.

In relation to the example considered in the present case (FIG. 1), the text below shows parts of the generated C++code.

| Reference No | |
|---|---|
| | /*<br>* generated code using template,<br>* template.cpp, do not edit<br>*/<br>#ifndef CS TEMPLATE_INCLUDED<br>#define CS TEMPLATE_INCLUDED<br>...<br>#include "tracebuf.h" |
| 1 | void Decision (void)<br>{<br>   TraceEntry (37,7,"Decision");<br>   /* The main entry in this CodingStrategy */<br>   TracePt (37,29); |
| 2 |    ProcEvent ( ); |
| 3 |    if (ResultStatus. is_set( )) { |
| 4 |       TracePt (37,36);<br>      /* Let RIC perform next coding step/early decision */<br>      /* Return to RIC */<br>      TracePt (37,46);<br>   L1:; |
| 13 |    TracePt (37,70); |
| 14 |    TraceVar (ResultStatus);<br>   TraceVar (UpdateDSU);<br>   TracePt (37,47); |
| 15 |    PostProc ( );<br>   TracePt (37,49); |
| 16 |    /* Let RIC perform next coding step/decision */<br>} else {<br>   TracePt (37,35);<br>   L2:;<br>   TracePt (37,9);<br>   /* Determine, if additional coding steps are necessary before final decision can be made */ |
| 5 |    CheckCoding ( );<br>   TracePt (37,16); |
| 6 |    if (ResultStatus.is_set( )) {<br>      TracePt (37,26);<br>   ... |
| 7 |       goto L1; /* 37,46 */<br>   } else {<br>      TracePt (37,18);<br>   ... |
| 8 |       PPDecision ( );<br>      TracePt (37,25); |
| 9 |       if (ResultStatus == RS_MoreCoding) {<br>      TracePt (37,27); |
| 10 |       ResultStatus.clear ( );<br>   ...<br>      goto L2; /* 37,35 */<br>   } else { |
| 11 |       TracePt (37,24);<br>   ...<br>      goto L1; /* 37,46 */<br>   }<br>} |

-continued

| Reference No |
| --- |
| } |
| TraceExit ("Decision"); /* 37,7 */ |
| } |

The trace buffer data recorded in the attribute file can be used for detailed analysis of the flow, controlled by the coding strategy, of each dispatch's processing.

A special user interface is used to show the user the information from the recorded trace buffer together with the associated original flowchart for the coding strategy.

Figure 2:
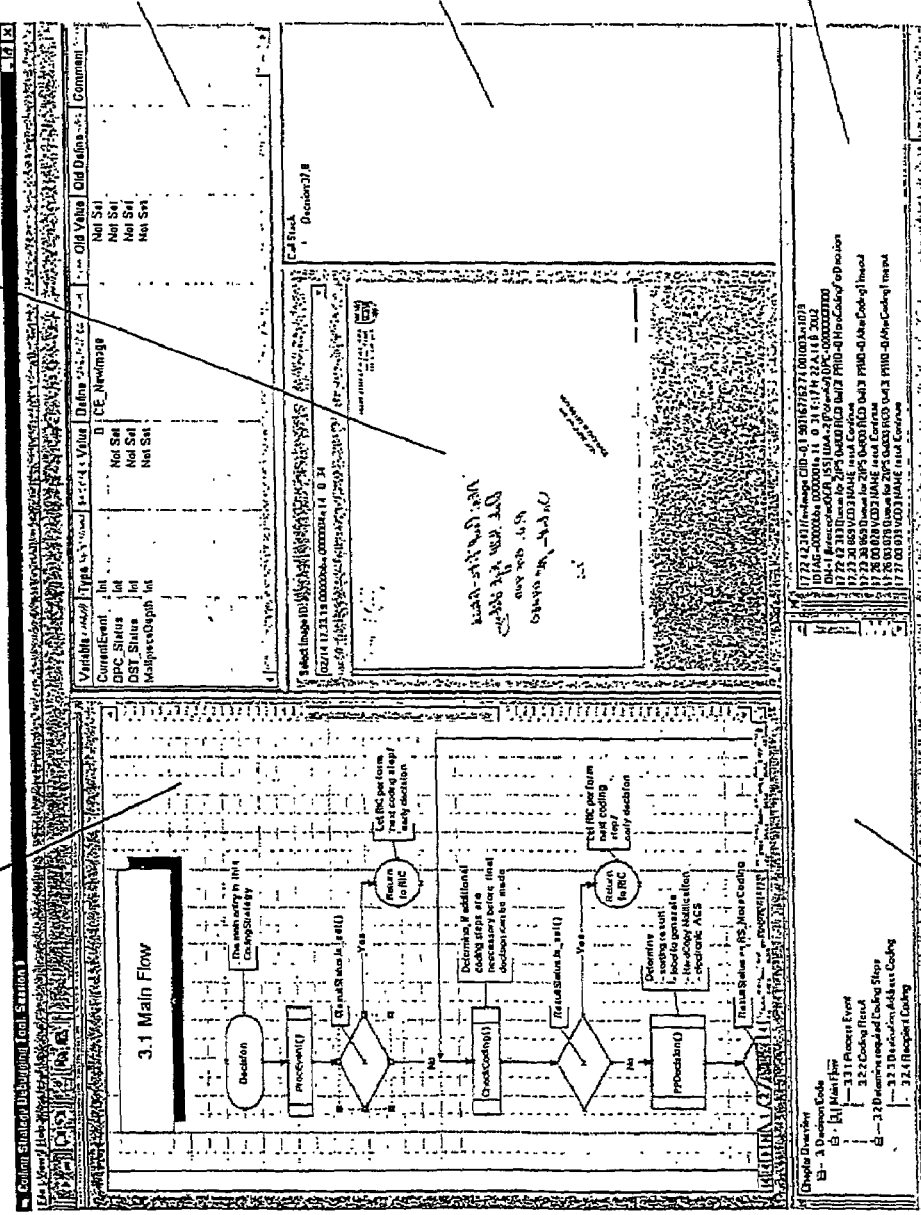
FIG. 2 shows a screen display for offline analysis relating to the above flowchart.

During the offline analysis, it is possible to reconstruct the flow of all the processing steps for a dispatch. In this context, the steps executed are displayed to the user in the original flowchart for the coding strategy with all the information relevant to analysis. To analyze the sequences of a coding strategy, the following information is displayed to the user in individual windows, as shown in FIG. 2:

drawing of the flowchart, the current position within the original drawing of the coding strategy is marked, 20,
the image of the dispatch, 21,
information relating to the attributes (based on the processing step, the particular current values of the attributes are displayed), 22,
call list for function calls, 23,
section index, number of the current section in the drawing (section and subsection for the current position) and list of all sections, 25,
optionally additional Logfile outputs, 24.

The user now has the opportunity to reconstruct the flow, stored in the trace buffer, of the respective dispatch's processing. In this case, as with a source level debugger, he has the opportunity to move through the trace buffer.

The normal commands of a source level debugger are supported:

use of break points,
step in,
step over,
step out, etc.

In the graphical representation of the coding strategy (VISIO flowchart), the particular current step is marked. The user sees the marker being guided through the drawing as the individual steps are executed. With each step, values and comments relating to the current values are displayed for all attributes. This means that the user has available, for each recorded dispatch, all the information necessary for analyzing the sequences of the coding strategy, i.e. all sequences can subsequently be analyzed in detail.

This method affords the opportunity for detailed analysis in relation to each individual dispatch which has been processed in the system. Even after a very large number of dispatches has been processed, analysis can still be carried out hours after the dispatches have actually been processed. This diagnostic tool allows even highly complex coding strategies to be analyzed, and in the case of incorrect decisions this method can be used to ascertain the specific causes of error.

The method described is also suitable for online tests. With online tests, a coding strategy under development can be executed and tested step by step. In this context, the user can use the development environment's user interface to define a break point in the depicted coding strategy with a special command. When the break point is reached, the image of the dispatch currently being processed is turned on in the user interface and the current trace buffer is used as described above to display and provide a detailed analysis of the flow up to the current situation. Unlike in the case of offline analysis, the attributes can also be changed in addition in this case, and hence the rest of the flow can be influenced. After analysis, processing can be continued (possibly up until the next break point).

The invention claim is:

1. A method for specifying executing and analyzing method sequences for the recognition of dispatch labels and form entries, comprising the steps of:

completing a specification phase describing plural individual processing steps of a method sequence for optical recognition of a data-filled form from one of a dispatch label and a form entry;

developing a graphical representation of each processing step of the method sequence, the method sequence input in graphical form into a computer system as a flowchart of the steps, each processing step corresponding to a separate flowchart block, each of the flowchart blocks having attributes and function details which define the influence of individual variables on that step of the method sequence;

compiling the graphical representation, with codes being automatically generated from the flowchart as an internal representation which is converted by means of a compiler into a loadable, executable module including each processing step for recognizing data filled into the respective dispatch label or form entry;

using the module, performing a handling phase for recognition of optically scanned data from each data field of a scanned data-filled form, the handling phase comprising, for each of the plural individual processing steps, displaying a corresponding one of the flowchart blocks on the computer together with information for describing the particular current data field and the current values of the attributes written to an attribute file for each processing step associated with the current data field and the current flowchart block of the current processing step;

performing an analysis phase, of the scanned data of that data field during each of the individual processing steps during the handling phase wherein each step of the method sequence is reconstructed by displaying the course of the data field processing including the current flowchart block with the attributes together with the associated scanned image of the scanned data-filled form, with the attributes showing the current values from the attribute file for the respective data field being analyzed.

2. The method as claimed in claim 1, characterized in that not only the attributes but also value ranges and comments are entered as part of the developing step.

3. The method as claimed in claim 1, characterized in that not only the current values of the attributes but also references relating to the associated names and comments are entered into the attribute file as part of the developing step.

4. The method as claimed in claim 1, characterized in that not only the current values of the attributes but also a respective reference relating to the relevant elements in the flowchart is entered into the attribute file as part of the developing step.

5. The method as claimed in claim 1, characterized in that, during analysis, the current method step is marked in the displayed flowchart.

6. The method as claimed in claim 5, characterized in that, during analysis, the attributes and comments of the current, marked method step are displayed.

7. The method as claimed in claim 1, characterized in that, during online analysis, sequences are tested by changing the values of the variables and/or parameters of the functions online, which influences the sequence.

8. The method as claimed in claim 3, characterized in that not only the current values of the attributes but also a respective reference relating to the relevant elements in the flowchart is entered into the attribute file.

9. A method. for specifying, executing and analyzing a method sequence for optical recognition of dispatch labels and form entries, comprising the steps of:
- identifying a method sequence for an optical character recognition analysis of data fields of an input form, including analysis steps for failed recognition of the data fields, the method sequence being expressed as a series of plural individual method sequence steps, the input form being one of a dispatch label and a form entry;
- specifying the method sequence steps in graphical form and inputting the graphical form of the method sequence steps into a computer system, the graphical form being a flowchart comprised of sequential flowchart blocks, each flowchart block corresponding to one method sequence step and comprised of attributes and function details defining optical character recognition of data associated with the corresponding method sequence;
- compiling the flowchart into a loadable, computer-executable module;
- optically reading data from each of the data fields of a data-filled input form;
- executing the computerexecutable module to handle analysis of the optically read data including displaying of the flowchart, the flowchart blocks and the attributes and function details associated with each flowchart block, as displaying an optically scanned copy of the data-filled input form;
- on a data field-by-data field basis, sequentially analyzing the optically read data from each data field corresponding to a different one of the method sequence steps as represented by a different one of the flowchart blocks, the attributes and function details defined for the corresponding flowchart block determining the analysis of the optically read data for that data field; and
- determining data value of each optically read data based on the corresponding displayed flowchart block and the displayed associated attributes and function details.

10. A method for specifying, executing and analyzing a method sequence for the recognition of an optically scanned data-filled form, comprising the steps of:
- performing a specification phase, including
- inputting, in graphical form, a method sequence into a computer system as a flowchart having plural flowchart blocks, each flowchart block having attributes and function details defining optical scanning recognition of a corresponding data field of a data-filled form;
- compiling the flowchart into a loadable, computer-executable module;
- optically scanning data from the data fields of the data-filled form and displaying the scanned form on a computer display;
- executing the module and displaying on the computer display the flowchart blocks;
- on a data field-by-data field basis, analyzing the scanned data by comparing the scanned data of each data field to a corresponding on of the flowchart blocks, including displaying the attributes and function details associated with the corresponding flowchart block of the data field currently being analyzed; and
- recognizing the data from the scanned data based on the displayed attributes and function details.

* * * * *